(12) United States Patent
Wittmann et al.

(10) Patent No.: US 12,537,028 B2
(45) Date of Patent: Jan. 27, 2026

(54) GENERATIVE VIDEO DATA STORIES

(71) Applicant: SAP SE, Walldorf (DE)

(72) Inventors: Michael Wittmann, Grafing (DE); Henrik Miers, Potsdam (DE); Pascal Keilbach, Vaterstetten (DE); Joshua Pusch, Munich (DE); Matthias Uflacker, Olching (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 18/664,395

(22) Filed: May 15, 2024

(65) Prior Publication Data

US 2025/0356883 A1 Nov. 20, 2025

(51) Int. Cl.
*G11B 27/036* (2006.01)
*G06F 40/40* (2020.01)

(52) U.S. Cl.
CPC ............ *G11B 27/036* (2013.01); *G06F 40/40* (2020.01)

(58) Field of Classification Search
CPC .............................. G11B 27/036; G06F 40/40
See application file for complete search history.

(56) References Cited

U.S. PATENT DOCUMENTS

| | | | |
|---|---|---|---|
| 5,996,015 A | 11/1999 | Day et al. | |
| 6,195,692 B1 | 2/2001 | Hsu | |
| 6,330,595 B1 | 12/2001 | Ullman et al. | |
| 7,139,813 B1 | 11/2006 | Wallenius | |
| 7,698,259 B2 | 4/2010 | Xue | |
| 8,479,246 B2 | 7/2013 | Hudson et al. | |
| 9,578,351 B1 | 2/2017 | Bynoe et al. | |
| 9,838,740 B1 | 12/2017 | Gilbert | |
| 9,930,415 B2 | 3/2018 | Gregov et al. | |
| 10,715,860 B1 | 7/2020 | Bartlett et al. | |
| 10,740,064 B1 | 8/2020 | Reddy et al. | |
| 10,783,214 B1 | 9/2020 | Rowe et al. | |
| 11,003,713 B1 | 5/2021 | Nagaraja et al. | |
| 11,277,411 B2 | 3/2022 | Sun et al. | |
| 11,500,911 B2 | 11/2022 | Nagaraja et al. | |
| 2008/0060034 A1 | 3/2008 | Egnal et al. | |
| 2010/0293190 A1 | 11/2010 | Kaiser et al. | |
| 2010/0325657 A1 | 12/2010 | Sellers et al. | |
| 2013/0272679 A1 | 10/2013 | Cavalcanti | |
| 2016/0092602 A1 | 3/2016 | Liu et al. | |
| 2018/0075879 A1 | 3/2018 | Prasad et al. | |
| 2018/0146217 A1 | 5/2018 | Kedenburg, III et al. | |
| 2018/0165283 A1 | 6/2018 | Rana et al. | |
| 2020/0329285 A1 | 10/2020 | Edwards et al. | |
| 2021/0185378 A1 | 6/2021 | Rajendran et al. | |
| 2023/0071358 A1 | 3/2023 | Van Welzen et al. | |
| 2024/0290357 A1 | 8/2024 | Uflacker et al. | |

(Continued)

OTHER PUBLICATIONS

U.S. Appl. No. 18/173,145, filed Feb. 23, 2023, Uflacker et al.

(Continued)

*Primary Examiner* — Girumsew Wendmagegn
(74) *Attorney, Agent, or Firm* — Fish & Richardson P.C.

(57) ABSTRACT

Methods, systems, and computer-readable storage media for a video generation platform that automatically generates videos, also referred to herein as stories, based on story templates, story data, and story metadata. The video generation platform provides interfaces for third-party systems to render videos and publish the videos as a story for defined channels and recipients.

20 Claims, 10 Drawing Sheets

(56) References Cited

U.S. PATENT DOCUMENTS

2025/0210064 A1\* 6/2025 McGuire .............. G11B 27/034
2025/0252271 A1\* 8/2025 Weisz ..................... G06F 40/40

OTHER PUBLICATIONS

Final Office Action in U.S. Appl. No. 18/173,145, mailed on Jun. 20, 2025, 26 pages.
Non-Final Office Action in U.S. Appl. No. 18/173,145, mailed on Feb. 4, 2025, 23 pages.

\* cited by examiner

GENERATIVE VIDEO DATA STORIES

BACKGROUND

Enterprises generate significant amounts of data representative of operations. For example, data can be representative of sales, profits, expenditures, taxes, employment statistics, and the like, among numerous other examples. Agents of enterprises (e.g., employees) frequently need to be aware of, interact with, and understand data in execution of tasks. However, the mass of available information requires adaption to new formats and interaction patterns to consume information efficiently ad-hoc, anytime, and anywhere.

Video is a compelling medium for communication. For example, advertisements often use video to engage consumers more effectively than other types of media (e.g., print, radio). Videos often include content that is used to provide information, which enables viewers to make decisions. For example, videos can be used in presentations to effectively engage an audience and inform the audience on particular topics. Further, video content has shown to be more memorable, to better guide the viewer's attention to what is important and change the way professionals communicate in a decidedly positive way. Relatively short, so-called bite-sized video content has seen a recent surge in consumer popularity on social media platforms. However, the creation of personalized short-form videos poses several challenges with regard to the technical requirements that enable enterprises to generate and distribute compelling audio-visual data stories in a secure, efficient, and scalable way.

SUMMARY

In view of the above context, implementations of the present disclosure provide a video generation platform for personalized data stories. More particularly, implementations of the present disclosure are directed to a video generation platform that automatically generates videos based on story templates, story data, and story metadata.

In some implementations, actions include receiving user input including a description of a story that a user seeks to convey in a video, transmitting a first prompt to a large language model (LLM) system, the first prompt including at least a portion of the user input, receiving, from the LLM system, storyboard code representative of a set of scenes, in response to the storyboard code, for each scene in the set of scenes, transmitting a second prompt to the LLM system, the second prompt including at least a portion of the storyboard code and a predefined set of layout templates, and receiving, from the LLM system, identification of a layout template of the predefined set of layout templates for a respective scene, for one or more layout templates in a set of layout templates identified by the LLM system, populating at least one placeholder with a data value, and displaying, in a user interface (UI), a storyboard for the video, the storyboard including graphical display of one or more scenes of the set of scenes. Other implementations of this aspect include corresponding systems, apparatus, and computer programs, configured to perform the actions of the methods, encoded on computer storage devices.

These and other implementations can each optionally include one or more of the following features: the storyboard code includes, for each scene, a description of a visualization of the respective scene, a layout template being identified by the LLM system at least partially in response to the description of the visualization; each layout template in the predefined set of layout templates is associated with at least one description, one or more layout templates being identified by the LLM system at least partially in response to the description; populating at least one placeholder with a data value is executed by the LLM system in response to a third prompt at least partially including the user input; actions further include receiving, from the user, revisions to an abstract displayed with a scene of the storyboard and in response, providing a modified scene using the LLM system responsive to the revisions; each layout template is provided in Javascript Object Notation (JSON); and actions further include receiving a request including a template identifier and a data payload, retrieving, from a data store, the story template based on the template identifier, the story template being of a first format and defining content elements and data to be depicted in a video, populating one or more data values of the data payload into the story template, providing, based on the story template, code in a second format that is different from the first format, generating the video based on the code, and transmitting the video to one or more users.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
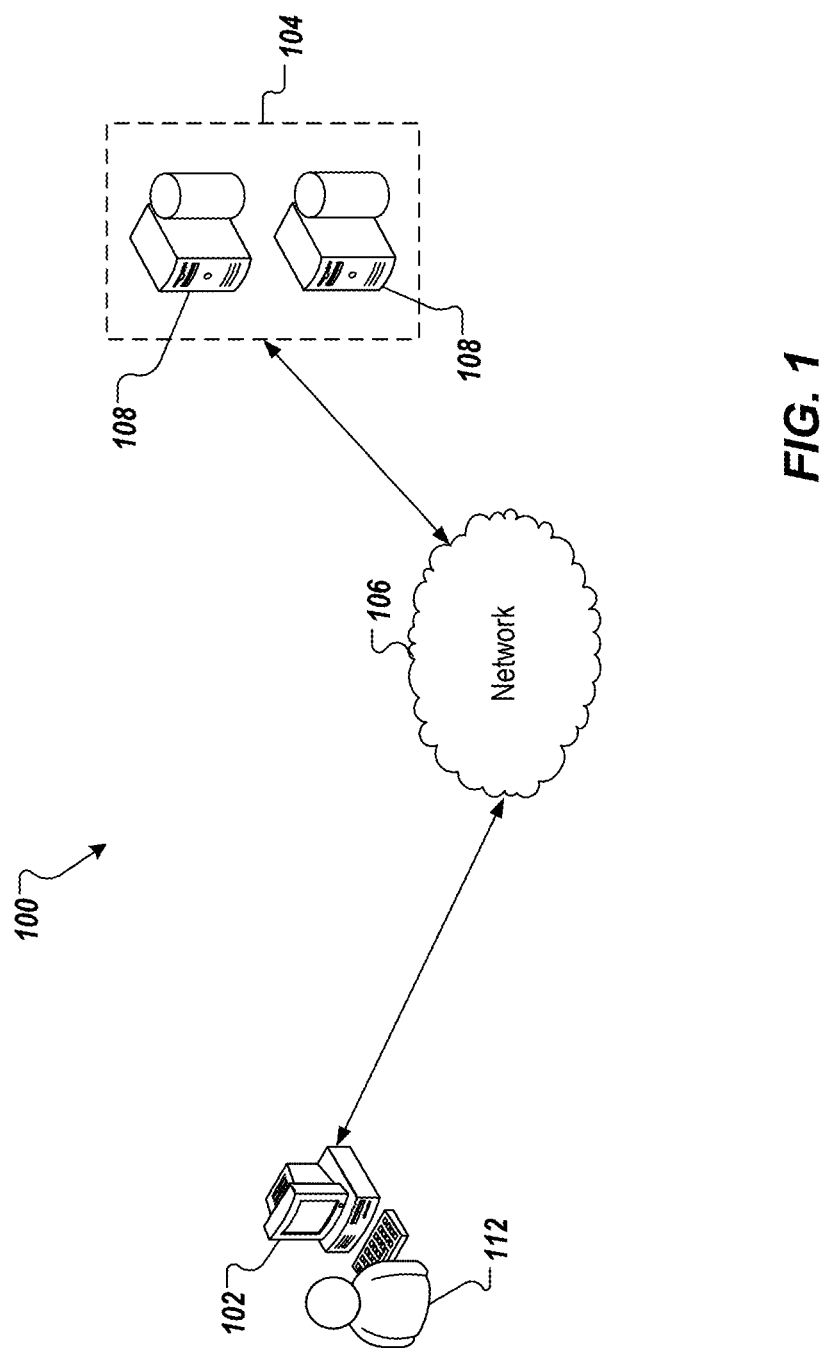
FIG. 1 depicts an example architecture that can be used to execute implementations of the present disclosure.

Implementations of the present disclosure are directed to a video generation platform. More particularly, implementations of the present disclosure are directed to a video generation platform that automatically generates videos, also referred to herein as stories, based on story templates, story data, and story metadata. The video generation platform provides interfaces for third-party systems to render videos and publish the videos as a story for defined channels and recipients. In some examples, a story template is provided in a first format (e.g., Javascript Object Notation (JSON)) and is converted to a second format (e.g., Hypertext Markup Language (HTML)), which is used to generate a video. In accordance with implementations of the present disclosure, story templates are provided using a large language model (LLM).

Implementations can include actions of receiving user input including a description of a story that a user seeks to convey in a video, transmitting a first prompt to a LLM system, the first prompt including at least a portion of the user input, receiving, from the LLM system, storyboard code representative of a set of scenes, in response to the storyboard code, for each scene in the set of scenes, transmitting a second prompt to the LLM system, the second prompt including at least a portion of the storyboard code and a predefined set of layout templates, and receiving, from the LLM system, identification of a layout template of the predefined set of layout templates for a respective scene, for one or more layout templates in a set of layout templates identified by the LLM system, populating at least one placeholder with a data value, and displaying, in a user interface (UI), a storyboard for the video, the storyboard including graphical display of one or more scenes of the set of scenes.

To provide further context for implementations of the present disclosure, and as introduced above, enterprises generate significant amounts of data representative of operations. For example, data can be representative of sales, profits, expenditures, taxes, employment statistics, and the like, among numerous other examples. Agents of enterprises (e.g., employees) frequently need to interact with data in execution of tasks. However, the mass of available information requires adaption to new formats and interaction patterns to consume information efficiently ad-hoc, anytime, and anywhere.

Video is a compelling medium for communication. For example, advertisements often use video to engage consumers more effectively than other types of media (e.g., print, radio). Videos often include content that is used to provide information, which enables viewers to make decisions. For example, videos can be used in presentations to effectively engage an audience and inform the audience on particular topics. Further, video content has shown to be more memorable, to better guide the viewer's attention to what is important and change the way professionals communicate in a decidedly positive way. Relatively short, so-called bite-sized video content has seen a recent surge in consumer popularity on social media platforms. However, the creation of personalized short-form videos poses several challenges with regard to the technical requirements that enable enterprises to generate and distribute compelling audio-visual data stories in a secure, efficient, and scalable way.

In an example use case, and without limitation, videos can be used to convey information regarding operations of an enterprise (e.g., sales figures, revenue figures), which information enables users to make decisions on enterprise operations. For example, videos can include embedded visualizations (e.g., in the form of charts, graphs, and the like) that graphically depict information (content) relevant to an audience. In many cases, the information is dynamic, changing over time (e.g., hourly, daily, weekly, quarterly, yearly). For example, an example video can include visualizations based on the revenue of an enterprise, which revenue changes daily.

Further, technologies can be employed to improve efficiencies in generating videos. An example technology includes generative artificial intelligence (GAI), such as large language models (LLMs). A LLM is trained using deep learning techniques and can have millions to billions of parameters. LLMs include a deep learning architecture, such as a recurrent neural network (RNN) or a transformer model. LLMs can generate human-like text and can perform various natural language processing (NLP) tasks (e.g., translation, question answering, code development).

However, implementing LLMs for video generation tasks is non-trivial in view of multiple technical challenges. This is particularly the case in the context of generation of videos to convey information regarding operations of an enterprise. For example, LLMs are trained on a broad array of data that is not specific to any particular domain, enterprise, and/or information regarding operations of any particular enterprise. Further, LLMs can suffer from so-called hallucinations, which can be described as factually incorrect and/or inaccurate output. Also, output of LLMs can be inconsistent. For example, a first prompt to a LLM can result in a first output that is not quite what is expected. Consequently, a second prompt can be provided to the LLM to nudge the LLM towards what is expected. However, a second output of the LLM can be significantly different than the first output. In short, LLMs are non-deterministic, such that output of LLMs can have a level of randomness and inconsistency.

In view of the above context, implementations of the present disclosure provide a video generation platform. More particularly, implementations of the present disclosure are directed to a video generation platform that lets users and/or other applications generate videos dynamically and ad-hoc based on a story template, story data, and story metadata. In some examples, the story template, also referred to as a template, is provided as a structured representation of an audio-visual data story. As used herein, a video, also referred to as a story, can be described as a composition of scenes, visual elements, style instructions, animation and timing settings, and the like, to convey information to viewers. In some examples, the story data is data that is dynamically included into a story as text, charts, graphics, speech, and the like. In some examples, the story metadata includes information to define recipients, channels, and other data required for publishing a story. The video generation platform automatically renders videos based on a story template, story data, and story metadata provided and publishes the videos as a story for defined channels and recipients.

Implementations of a video generation platform are described in further detail in commonly assigned U.S. application Ser. No. 18/173,145, entitled PROGRAMMATIC GENERATION OF SHORT-FORM VIDEOS TO TRANSPORT AUDIO-VISUAL DATA STORIES, and filed on Feb. 23, 2023, which is expressly incorporated herein by reference in the entirety for all purposes.

In accordance with implementations of the present disclosure, the video generation platform leverages a LLM to generate story templates. In some examples, the LLM is a third-party LLM that is accessible over a network (e.g., through an application programming interface (API)). An example LLM includes, without limitation, GPT models (e.g., GPT-4 provided by OpenAI). In some implementations, output of the LLM is constrained, such that templates generated have consistency in look and feel across different scenes and stories, and accurately convey stories. In some examples, this is achieved by a framework that feeds the LLM with context and parameters and provides pre-defined layouts to constrain templates output by the LLM for consistency. As such, implementations of the present disclosure enable use of a LLM to generate story templates that provide coherency in a look and feel of a video across scenes of the video, as well as across different videos. Further, implementations of the present disclosure guide the LLM away from outputting a textual, narrative story to instead output a story template multiple scenes defined through computer-executable code (e.g., JSON) to convey a data-driven story. That is, while a narrative story can be provided through the resulting video, the LLM's contribution to the narrative story is limited to avoid potential inaccuracies and/or hallucinations (that can arise with use of LLMs) are avoided.

As also described in further detail herein, the video generation platform of the present disclosure provides a story designer, a template repository, and an application (e.g., a web application). In some examples, the story designer is provided as a web-based visual design tool that enables the creation and modification of story templates. In some examples, the template repository is used to store and provide pre-defined story templates and styles that can be used as a starting point for the creation of new story templates. In some examples, the application enables individuals in an organization to subscribe to channels and access, comment, and share the latest video stories published for them.

Implementations of the present disclosure are described in further detail with reference to an example use case that includes videos that convey information representative of enterprise operations. It is contemplated, however, that implementations of the present disclosure can be realized in any appropriate use case.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as described in further detail herein, story data that is to be conveyed within a video can be provided based on data stored within one or more data sources. In some examples, the data source(s) can be hosted by the server system 104. Example data sources can include, without limitation, a data file (e.g., a comma-separated values (CSV) file) and a database (e.g., an in-memory database). In some examples, data is stored in a data object, which can be provided as a data cube (e.g., an online analytical processing (OLAP) data cube). In some examples, a data cube is provided as an array of data categorized into one or more dimensions. For example, a data cube can be a representation of a multi-dimensional spreadsheet (e.g., a multi-dimensional dataset including a plurality of data tables). In some examples, a data cube includes a plurality of cells, where cells are populated with respective values (e.g., number, text). In some examples, each value represents some measure (e.g., sales, revenue, profits, expenses, budget, forecast).

In some implementations, a data cube can enable manipulation and/or analysis of data stored in the data cube from multiple perspectives (e.g., by dimensions, measures, and/or elements of the data cube). In some examples, a dimension of a data cube defines a category of stored data. Example dimensions can include, without limitation, time, location, product. In some examples, each dimension can have one or more sub-dimensions. For example, the time dimension can include sub-dimensions of year, each sub-dimension of year can include sub-dimensions of quarter, each sub-dimension of quarter can include sub-dimensions of month, each sub-dimension of month can include sub-dimensions of week, and so on. As another example, the product dimension can include sub-dimensions of category, and each sub-dimension of category can include sub-dimensions of line. As another example, the location dimension can include sub-dimensions of country, each sub-dimension of country can include sub-dimensions of region (e.g., north, east, west, south, mid-west), each sub-dimension of region can include sub-dimensions of sub-region (e.g., state, province), and each sub-dimension of sub-region can include sub-dimensions of city. In some examples, a data cube can include three-dimensions. In some examples, a data cube having more than three-dimensions is referred to as a hypercube.

As noted above, data stored in the data object includes one or more measures. In some examples, each measure is a fact (e.g., a numerical fact, a textual fact). In some examples, each measure can be categorized into one or more dimensions. Example measures can include specific product sales data (e.g., quantity sold, revenue, and/or profit margin), categorized by dimension. In short, measures can include any appropriate data that may be manipulated according to logic to assist or support the enterprise.

In accordance with implementations of the present disclosure, and as noted above, the server system 104 can host a video generation platform that automatically generates videos based on a story template, story data, and story metadata. In some examples, videos generated in accordance with implementations of the present disclosure can convey content that changes over time. In some examples, the video is displayed to the user 112 within the client device 102. For example, the video can be displayed within an application executed by the client device 102.

Figure 2:
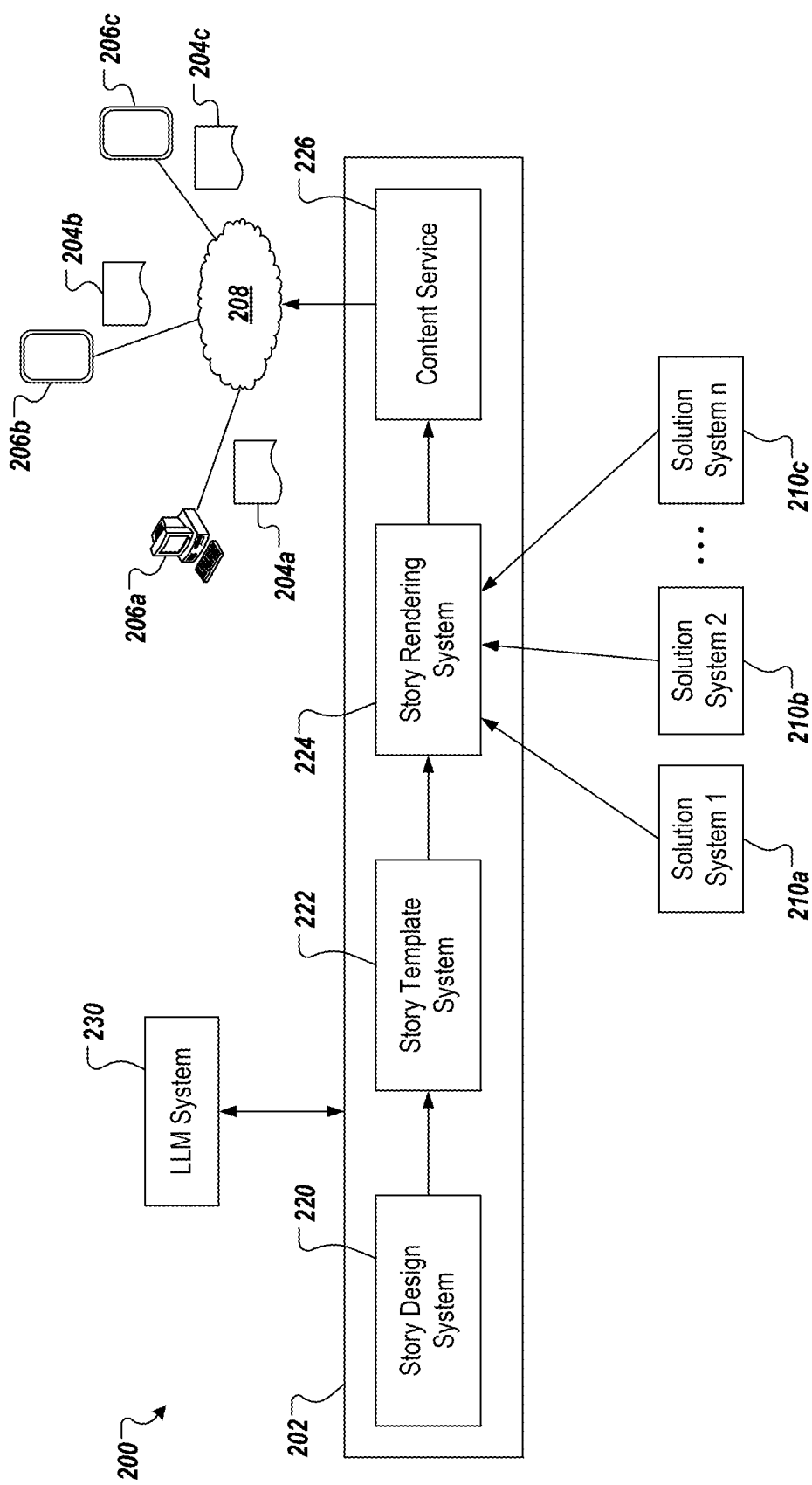
FIG. 2 depicts a conceptual architecture including a video generation platform in accordance with implementations of the present disclosure.

FIG. 2 depicts a conceptual architecture 200 including a video generation platform 202 in accordance with implementations of the present disclosure. In some examples, the video generation platform is provided as a cloud-based platform that can be provisioned in any appropriate cloud runtime. An example cloud runtime includes, without limitation, the SAP Kyma runtime (SKR), which is provided by SAP AG of Walldorf, Germany, and can be described as a fully managed Kubernetes-based runtime. Another example cloud runtime includes Cloud Foundry.

In the example of FIG. 2, the video generation platform 202 automatically generates videos 204a, 204b, 204c that are provided to computing devices 206a, 206b, 206c over a network 208 (e.g., the Internet). As described in further detail herein, the video generation platform 202 can retrieve data from one or more systems 210a, 210b, 210c, and at least a portion of the data can be used as story data in one or more of the videos 204a, 204b, 204c.

In the example of FIG. 2, the video generation platform 202 includes a story design system 220, a story template system 222, a story rendering service 224, and a content service 226. In some examples, the story design system 220 provides a story design application as a web-based visual editing tool for creating, modifying, and managing story templates in a what-you-see-is-what-you-get (WYSIWYG) paradigm. In this manner, designers can create and/or modify story templates in a visual manner without requiring programming skill. In some examples, the story template system 222 enables access to story templates provided by the story design system. In this manner, users can share and re-use story templates. In some examples, and as described in further detail herein, each story template defines a structure and flow of a story as conveyed in a video.

In some examples, the story rendering service 224 can be provided as a cloud-based service for applications to generate the videos 204a, 204b, 204c from respective story templates and publish the videos 204a, 204b, 204c to specified users and/or user groups. As described in further detail herein, the story rendering service 224 can make calls to one or more of the systems 210a, 210b, 210c to retrieve data can be used as story data in one or more of the videos 204a, 204b, 204c. In some examples, data requested from one or more of the systems 210a, 210b, 210c is based on definitions provided in a story template. In some examples, the content service 226 organizes and publishes the videos 204a, 204b, 204c in one or more channels. For example, users can subscribe to channels to receive personalized stories (videos) about a specific topic and/or domain.

In some implementations, each video (story) is based on a declarative JSON schema that enables videos to be dynamically generated based on a story definition. In some examples, a video can be generated as a one-off video based on the story definition. In some examples, the story definition can be provided within a respective story template, such that multiple videos can be generated by reusing the story template. In some examples, the story template (e.g., provided in JSON) serves as a language agnostic abstraction layer. As described in further detail herein, a story can include multiple scenes, each scene representing a sub-chapter of the story. In this manner, when rendered as a video, users can jump back-forth between different parts of the story.

In the example of FIG. 2, the conceptual architecture 200 includes a LLM system 230. In some examples, the LLM system 230 is provided as a third-party system that is accessible to the video generation platform 202 (e.g., through an API). The video generation platform 202 can also referred to as a story generation platform in view of the platform providing stories that are conveyed through the resulting videos. In generating stories, the video generation platform 202 can send requests (e.g., in the form of prompts) to and receive responses from the LLM system 230. As described in further detail herein, the video generation platform 202 leverages the LLM system 230 to generate story templates, which can be used to provide a set of scenes that convey a story in a resulting video. In some examples, the story design system 220 enables interaction with the LLM system 230 to generate story templates.

In some implementations, a story template includes metadata section, a content section, and a data section. In some examples, the metadata section includes title metadata, description metadata, channel metadata, allowed user metadata, tags metadata, and data source metadata. The title metadata and the description metadata respectively provide a title and description for the story represented within the story template. The channel metadata indicates one or more channels that videos generated using the story template will be published to. The allowed users metadata identifies one or more users and/or user groups that are able to access the video. The tags metadata enables topics to be added as tags that enable the video to be surfaced in search results (e.g., a search query includes a tag that is included in the story template). The data source metadata indicates one or more data sources (e.g., applications, systems) that provide data to populate for presentation in videos generated using the story templated. In some examples, and as described in further detail herein, the content section contains everything that defines the structure, layout, style, and elements of the story within the story template. In some examples, the data section specifies data that is to be populated in variables of the content section for rendering of the videos.

An example story template is provided in Listing 1:

---
Listing 1: Example Story Template
---

```
{
VIDEO DATA STORY METADATA ###
"title": "Hello World",
"description": "This is an example",
"channel": "hello-world",          ### CONTENT CHANNEL
"allowed_users": [                  ### TARGETED USERS
   "example@example.com"
],
"tags": [
   "example",
   "helloworld"
],
"info_url": "https://www.example.org",  ### LINK TO THE
DATASOURCE/APPLICATION
VIDEO DATA STORY TEMPLATE ###
```

-continued

Listing 1: Example Story Template

```
"content": {
  "scenes": [
    {
      "content": {
        "type": "VStack",          ### VISUAL BUILDING BLOCK
        "style": {                 ### STYLING
          "background-color": "$colorAlt"
        },
        "content": [
          {
            "type": "Text",        ### VISUAL BUILDING BLOCK
            "content": "{{ value}}",### VALUE TO BE REPLACED BY DATA
            "animations": [        ### ANIMATIONS TO BE APPLIED TO THE ELEMENT
              {
                "type": "FlyLeft",
                "duration": 3,
                "delay": 1
              }
            ]
          }
        ]
      }
    }
  ]
},
VIDEO DATA STORY DATA ###
"data": {
  "value": "Video Data Stories"
}
}
```

In the example of Listing 1, the content section includes a variable (value) that is to be replaced by data ("Video Data Stories") defined in the data section. In further detail, and as noted above, the content section defines the structure, the layout, the styling, and the like, of a story. Each story can be composed of standardized elements. In some examples, stories can have a default resolution (e.g., 720×1280 px) and/or frame rate (e.g., 24 fps). Other example listings that can be usable with story templates (e.g., settings, scenes, animations, audio) are described in further detail in commonly assigned U.S. application Ser. No. 18/173,145, introduced above.

Figure 3:
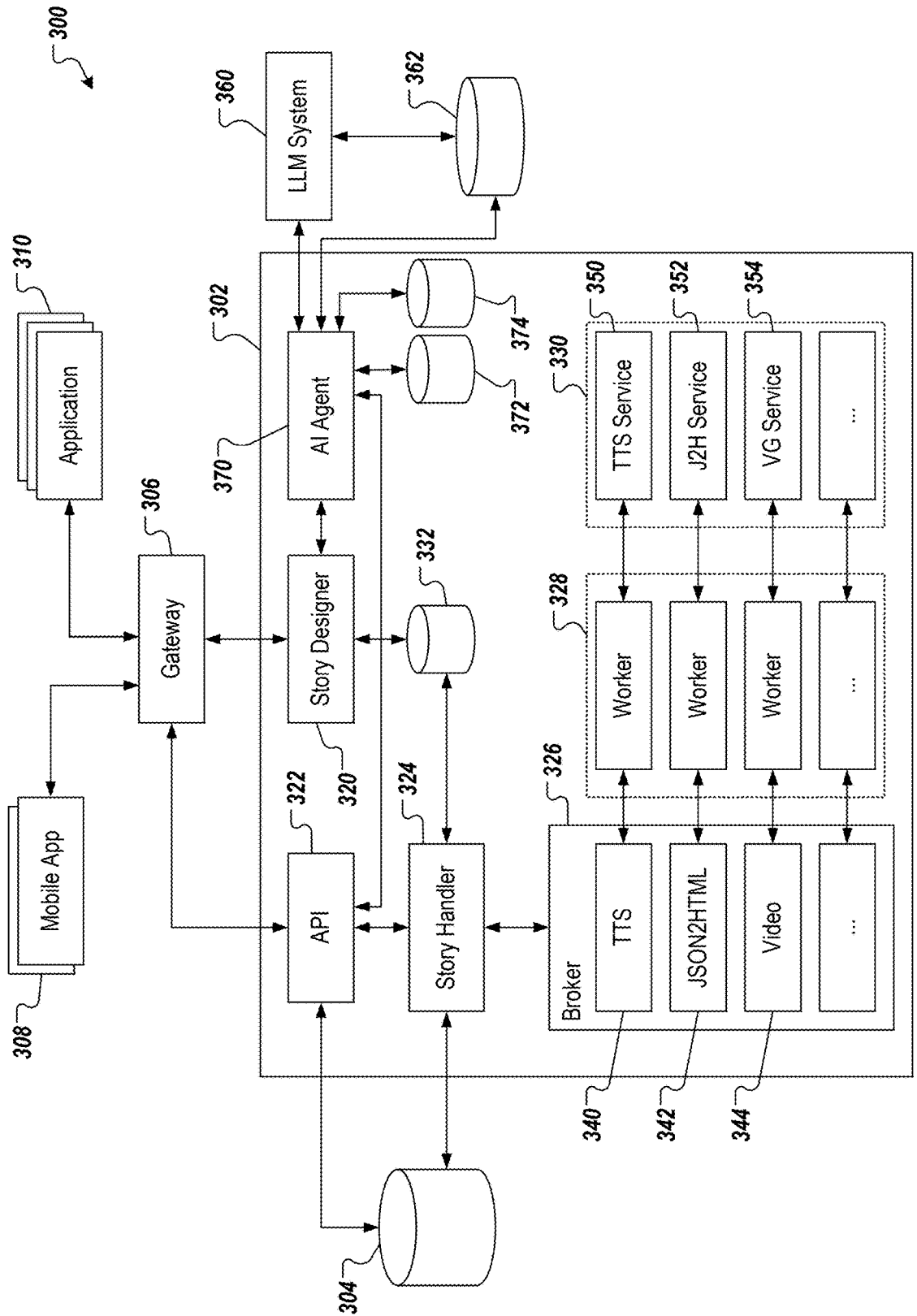
FIG. 3 depicts an example architecture including a video generation platform in accordance with implementations of the present disclosure.

FIG. 3 depicts an example architecture 300 including a video generation platform 302 in accordance with implementations of the present disclosure. The video generation platform 302 of FIG. 3 can correspond to the video generation platform 202 of FIG. 2. In the example of FIG. 3, the video generation platform 302 automatically generates videos that can be stored in a video store 304 and that are published, through a gateway 306, to one or more operating system mobile applications 308. Although mobile applications 308 are referenced herein for purposes of illustration, the video generation platform 302 can publish videos for consumption by any appropriate application. In some examples, and as described in further detail herein, generation and publishing of video can be triggered by one or more applications 310. In the example context, the one or more applications 310 can include software systems used by an enterprise to perform operations of the enterprise. Example software systems can include, without limitation, an enterprise resource planning (ERP) system, a customer relationship management (CRM) system, and a human capital management (HCM) system, among many others.

In the example of FIG. 3, the example architecture 300 includes a LLM system 360 and one or more external data sources 362. In some examples, the LLM system 360 is provided as a third-party system that is accessible to the video generation platform 302 (e.g., through an API). The LLM system 360 of FIG. 3 can correspond to the LLM system 230 of FIG. 2. In some examples, the video generation platform 302 can send requests (e.g., in the form of prompts) to and receive responses from the LLM system 360. As described in further detail herein, the video generation platform 302 leverages the LLM system 360 to generate story templates. In some examples, the one or more external data sources 362 can include third-party data sources (e.g., websites, databases).

In the example of FIG. 3, the video generation platform 302 includes a story designer 320, an application programming interface (API) 322, a story handler 324, a broker service 326, a set of workers 328, a set of services 330, a database 332, an AI agent 370, a scene layout repository 372 (e.g., storing layout templates, described in further detail herein), and one or more enterprise data sources 374. In some examples, the broker 326 includes a set of queues for coordinating execution of jobs to respective services in the set of services 330 through respective workers. For example, a TTS queue 340 communicates with a TTS service 350 through a respective worker, a JSON-to-HTML (JSON2HTML, J2H) 342 communicates with a J2H service 352 through a respective worker, and a video queue 344 communicates with a video generation service 354 through a respective worker. While individual services are depicted in the example of FIG. 3, it is contemplated that one or more of the services can be scaled depending on workload.

In some implementations, a designer (e.g., a user) can communicate with the story designer 320 through the gateway 306. As introduced above, the story designer 320 can include a web-based visual editing tool for creating, modifying, and managing story templates in a WYSIWYG paradigm. As also introduced above, the story designer 320 can enable interactions with the LLM system 360 to generate story templates. The story templates can be stored in the database 332.

In accordance with implementations of the present disclosure, the LLM system 360 can be leveraged to generate story templates. For example, and as described in further detail herein, a designer (e.g., a user) can communicate with the story designer 320 through the gateway 306 to interact with the AI agent 370 to generate a story template using the LLM system 360. For example, the designer can provide a prompt that is descriptive of a story that is to be conveyed in a video and the AI agent 370 can interact with the LLM system 360 to generate a story template responsive to the prompt, as described in further detail herein.

Figure 4:
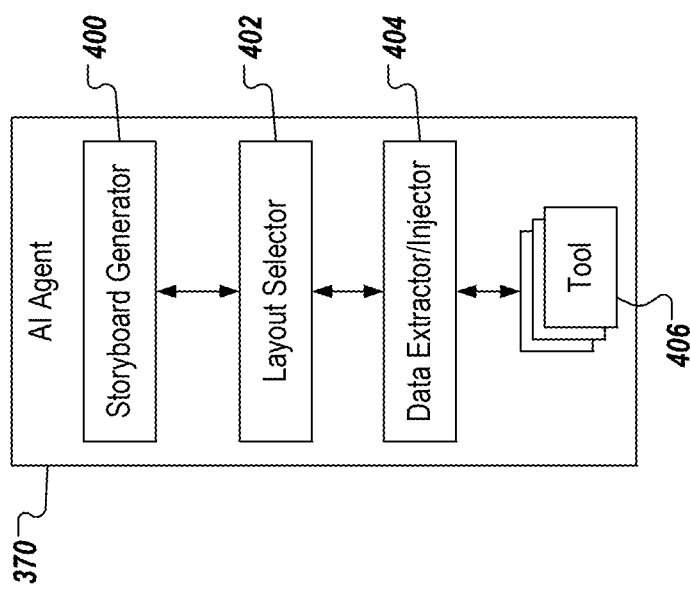
FIG. 4 depicts example components of an artificial intelligence (AI) agent in accordance with implementations of the present disclosure.

FIG. 4 depicts example components of the AI agent 370 of FIG. 3. In the example of FIG. 4, the AI agent 370 includes a storyboard generator 400, a layout selector 402, a data extractor/injector 404, and one or more tools 406. In some examples, the storyboard generator 400 interacts with a LLM system (e.g., the LLM system 360 of FIG. 3) to provide a storyboard based on user input. In some examples, the storyboard includes a set of scenes to be depicted in a video. In some examples, the layout selector 402 interacts with a LLM system (e.g., the LLM system 360 of FIG. 3) to determine a layout for each scene of the storyboard. In some examples, the data extractor/injector 404 enables data to be populated in scenes of the storyboard. In some examples, the one or more tools 406 can be optional to provide optional functionality to the AI agent 370. In some examples, the one or more tools 406 can include, without limitation, a background video generation tool, a web search tool, an audio tool, and a styling tool.

Referring again to FIG. 3, when modifying an existing video, a story template for the video is retrieved from the database 332 and scenes of the video can be displayed to the designer by the story designer 320. In response to input of the designer, the story template can be modified. For example, elements and respective attributes and/or metadata can be added, removed, and/or modified.

In some implementations, each video can be designated for one or more channels, one or more users, and/or one or more user groups. For example, the designer can provide input to the story designer 320 to define channel metadata indicating one or more channels that the video is to be published to, such that users that subscribe to the one or more channels can receive the video. As another example, the designer can provide input to the story designer 320 to define allowed user metadata to indicate one or more users (e.g., by unique identifier, such as email address) that the video is to be accessible to, such that the indicated users can receive the video. As another example, the designer can provide input to the story designer 320 to define allowed user metadata to indicate one or more user groups (e.g., by unique group identifier) that the video is to be accessible to, such that users in the indicated user groups can receive the video.

In some implementations, after creating a story template, the story template can be made available for generating videos. In some examples, a post request for the story template can be sent (e.g., through the API 322). In response to a successful post request, an identifier that uniquely identifies the story template is returned.

In some implementations, after a story template is created and posted, one or more of the applications 310 can trigger generation of a video using the story template. For example, an application 310 can schedule triggers to generate a story based on a respective template (e.g., daily, weekly, monthly, quarterly, annually). As another example, an application 310 can include one or more rules that, if met, trigger generation of a story based on a respective template. In some examples, in response to a trigger, the application 310 generates a request to the video generation platform 302. In some examples, the request includes an identifier (e.g., "634eab497986822fb5533e7c") that indicates the story template that is to be used and a data payload (e.g., data and metadata to specify eligible users and channels) that provides data values for data that is to be populated in the story template as content within the video that is generated. For example, for a particular story template, data values (e.g., measures from a data cube) that are needed can be defined. The application 310 can retrieve the data values from, for example, a database to include in the data payload.

In some implementations, in response to receiving a request, the story handler manages a series of tasks based on dependencies (e.g., defining an order of task execution). Example tasks can include, without limitation, retrieving the story template, populating the data section of the story template with data provided in the data payload of the request, transmitting one or more jobs to the TTS service 350 (if the story template requests TTS), transmitting a job to the J2H service 352, and transmitting a job to the video generation service 354. An example order of tasks can include transmitting the one or more jobs to the TTS service 350 (if the story template requests TTS), receiving the TTS audio, transmitting the job to the J2H service 352, receiving a HTML file, transmitting the job to the video generation service 354, and receiving the video.

In further detail, the story handler 324 populates the data section of the story template with data values received with the request. For example, story template can include one or more variables representative of one or more measures. The data section of the story template can include a placeholder for a data value for each measure, each placeholder being populated with a respective data value provided in the data payload of the request.

In some examples, if the story template includes TTS elements, a TTS job can be sent for each TTS element to the TTS service 350. In some examples, a TTS element can include constant text (i.e., text that does not change between video generations) within the story template. For example, if the content section defines a TTS text element as 'Profit this week is down' the story handler 324 provides a job request to the broker service 326 for processing through the TTS queue 340, which transmits the job request to the TTS service 350 (through a respective worker), the job request including the text 'Profit this week is down.' The TTS service 350 returns an audio snippet as audio data that, when executed, audibly plays 'Profit this week is down.' In some examples, a TTS element can include variable text (i.e., text that does change between video generations) within the story template. For example, if the content section defines a TTS text element as a variable 'profit_value,' the story handler 324 populates the variable with a data value provided in the data payload of the request. For purposes of non-limiting illustration, the data value can be provided as 30%. The story handler 324 provides a job request to the broker service 326 for processing through the TTS queue 340, which transmits the job request to the TTS service 350 (through a respective worker), the job request including the text '30%.' The TTS service 350 returns an audio snippet as audio data that, when executed, audibly plays '30%.' In these examples, the audio data can be played consecutively to provide audio of 'Profit this week is down' 'thirty percent.'

In some implementations, after the data section of the story template has been populated with data values from the data payload and TTS audio, if any, has been generated and received, the story handler 324 provides a job request to the broker service 326 for processing through the JSON2HTML queue 342, which transmits the job request to the J2H service 352 (through a respective worker), the job request including the story template. The J2H service converts the story template into HTML code and returns the HTML code.

In response to receiving the HTML code, the story handler 324 provides a job request to the broker service 326 for processing through the video queue 344, which transmits the job request to the video generation service 354 (through a respective worker), the job request including the HTML code. The video generation service 354 generates a video and returns the video. In some examples, the video generation service 354 generates the video by executing the HTML code in a browser application to provide one or more web pages, which represent content elements. In some examples, the video generation service 354 captures screenshots of the one or more web pages, each screenshot being used as a frame in the video. For example, the video generation service 354 can capture screenshots based on a defined framerate (e.g., 24 fps). The screenshots collectively define the frames of the video (i.e., the visual of the video). In some examples, the video generation service 354 provides one or more audio tracks for playing audio of audio files and/or TTS audio, if any. The frames and audio track(s) are exported to a video file (e.g., .mov, .mp4, .wmv).

In some implementations, the video (video file) is stored in the video store 304. In some examples, one or more users that are determined to be the audience for the video (e.g., based on channel metadata, allowed user metadata) are alerted to the availability of the video. For example, a notification can be transmitted to a mobile application 308 of a user. In some examples, in response to user input (e.g., selecting the notification), the video is retrieved from the video store 304 and transmitted to a device (e.g., smartphone, tablet) of the user to be played. In some examples, instead of transmitting an entire video file to the device, the video can be streamed to the device.

For the purposes of illustration, implementations of the present disclosure are described in further detail herein with reference to an example, non-limiting story template. The example story template corresponds to key performance indicators (KPIs) for human resources (HR) of an enterprise. It is contemplated, however, that implementations of the present disclosure can be realized to provide any appropriate story template.

In accordance with implementations of the present disclosure, and as introduced above, a LLM system (e.g., the LLM system 360 of FIG. 3) can be leveraged to generate story templates for videos. In some implementations, a designer can provide a prompt to initiate generation of a story template. For example, a user interface (UI) (e.g., provide by the story designer 320 of FIG. 3) can be used to receive user input. In some examples, the user input is a prompt that describes a story that is to be depicted in a story presented through a video. In accordance with the non-limiting example, an example prompt can include:

As the Head of the new technologies organization at ACME, I need a summary of my HR KPIs including HeadCount Development, Gender Ratio and Attrition Rate. Please use a dummy data set for this organization that consists of roughly 400 employees.

In the example above, the prompt includes a request to use a dummy data set. In some examples, the user input can specify a dataset that is to be used (e.g., a data file, a location of a data source).

In some implementations, the video generation platform requests a storyboard from the LLM system based on the user input. For example, and with reference to FIG. 3, the AI agent 370 (e.g., the storyboard generator 400) sends a request for a storyboard to the LLM system 360, which can include at least a portion of the user input. The request can be provided as a prompt to the LLM system 360. A non-limiting, example prompt can be provided as:

You are part of a software that helps the user to create an audio-visual data story (Video Data Story).
Context
A Video Data Story is a TikTok-like video that aims to summarize essential insights and is easy to digest.
A Video Data Story works similar to a PowerPoint slideshow, but in a modern format ment to be consumed on mobile phones. It is meant to be self narrating without a presenter.
A Video Data Story contains multiple parts, so-called scenes. Consider the primary purposes of scenes:
1. Content Segmentation:
   Scenes break down your data story into manageable sections or topics.
   Each scene typically covers one main point, idea, or topic. This segmentation makes it easier for the user to follow along.
2. Self-Explanatory:
   By providing visual support for the data story you want to communicate.
   A scene can include one or more headlines, text, images, charts, Lottie animations and more.
3. Structure and Flow:
   Scenes help you structure your video data story and guide the flow of information.
   They create a logical sequence, allowing you to communicate information in a coherent and organized manner. This structure ensures that your audience can follow your train of thought.
4. Highlight Key Points:
   Scenes allow you to emphasize key points, facts, or takeaways. By using bullet points, headlines, and visual elements like charts, you can draw attention to the most important information you want your audience to remember.
5. Provide Context:
   Scenes can provide context for your audience.
   You can include background information, definitions, or explanations to ensure your audience understands the subject matter.
6. Transition and Visual Breaks:
   Scenes are used to transition between different topics or sections of your data story.
   They act as visual breaks that signal the user that you're moving on to a new point.
Based on experience a good order of magnitude for the number of scenes is between 3 and 10.
Remember: Video Data Stories meant to be consumed on mobile phones. Avoid table-like data representation, as they are not easy to digest on small screens!
Instructions
Your task is to create a storyboard for the video data story based on the user's input.
The storyboard should contain a title for each scene, a detailed description of what is to be shown in that scene and a detailed description how the content should be visualized.
Make sure to stick in that range of the suggested number of scenes.

In response to the request (prompt), the LLM system 360 returns computer-readable code that is descriptive of a storyboard that includes a set of scenes. Listing 2 provides an example portion of storyboard code that can be returned by the LLM system 360 in response to the example prompt above:

```
[
  {
    "idx": 1,
    "title": "Introduction",
    "abstract": "Introduction to the HR KPIs of the new technologies organization at ACME.",
    "visualization": "A title card with the text 'HR KPIs of the new technologies organization at ACME' is shown. A Lottie animation of a corporate building with the ACME logo is displayed."
  },
  {
    "idx": 2,
    "title": "HeadCount Development",
    "abstract": "Overview of the HeadCount Development of the new technologies organization.",
    "visualization": "A line chart is shown, representing the HeadCount Development over the last 12
``` months. The chart shows a steady increase in the
number of employees, from around 350 to 400."
},
{
"idx": 3,
"title": "Gender Ratio",
"abstract": "Insights into the Gender Ratio within the
new technologies organization.",
"visualization": "A pie chart is displayed, showing the
Gender Ratio. The chart shows that the organization
consists of approximately 60% male and 40% female
employees."
},
...

Listing 2: Example Storyboard Code

Here, idx is the index of a respective scene, the abstract is the content that is to be displayed in the respective scene, and the visualization describes how the content is to be visualized in the respective scene.

Figure 5:
FIG. 5 depicts example layout templates for scenes in accordance with implementations of the present disclosure.

In response to receiving the storyboard code, a layout template is selected for each scene represented in the storyboard code. In some implementations, the layout templates are selected from a pre-defined set of layout templates. FIG. 5 depicts an example pre-defined set of layout templates 500 for scenes in accordance with implementations of the present disclosure. As described in further detail herein, the pre-defined set of layout templates enables the LLM system to be constrained in generating a story template to enable consistency and coherency in a look and feel of a video across scenes of the video, as well as across different videos.

In further detail, each layout template is provided as computer-readable code in, for example, JSON format that is descriptive of content and locations of context that is to be presented. In some examples, the computer-readable code includes placeholders for data that is to be populated. Each layout template is associated with a layout description and a purpose description. In some examples, the layout description includes a textual description of a layout depicted in the layout template. A non-limiting example layout description for a layout template depicting a pie chart can include:

A pie chart illustrates the relationship between various values and their proportion within a single variable. The chart includes labels atop each segment, displaying precise values in either percentages or numerical format. A concise headline (up to 30 characters) introduces a specific topic, while a brief description (up to 150 characters) offers additional context about the subject and the data.

In some examples, the purpose description includes a textual description of one or more purposes of the layout template. A non-limiting example purpose description for the layout template depicting a pie chart (introduced above) can include:

This layout facilitates a quick comparison of 2 to 5 data segments. It's designed for presenting the values without the need for extensive individual explanations.

In some implementations, for each scene of the storyboard returned by the LLM system, a prompt is sent to the LLM system to select a layout template for a respective scene from the pre-defined set of layout templates. In some examples, the prompt includes one or more constraints to constrain execution of the layout template selection task of the LLM system. A constraint can include the predefined set of layout templates. A constraint can include a sub-set of the pre-defined set of layout templates. A non-limiting example prompt can be provided as:

The input is given to you as a JSON Object that adheres to the following "JSON Schema":
{story board item format}
Based on this input, your task is to choose the best layout for the scene out of a collection of layout templates. Take the following steps:
1) Choose the best fitting layout template based on the visualization instructions defined in the storyboard by comparing it with the description from the possible scene layout templates.
2) If none of the layout templates are a good fit, use "DEFAULT" as the response.
You ONLY have the following layout templates to choose from:
//Layout Templates
{scene layout templates}

Here, {story board item format} is an identifier (e.g., filename) that is used to define the format of the scene that a layout template is being selected for and {scene_layout_templates} is an identifier (e.g., filename) that is used to identify the set of layout templates that the LLM system is constrained to.

In some examples, the prompt is provided to the LLM system with at least a portion of the storyboard code for a respective scene, for which the LLM system is to select a layout template. Continuing with the non-limiting example of Listing 2, a portion of the storyboard code for a Gender Ratio scene (scene code) is depicted in Listing 3.

{
...
"visualization": "A pie chart is displayed, showing the
Gender Ratio. The
chart shows that the organization consists of approxi-
mately 60% male and 40%
female employees."
}, Listing 3: Example Scene Code In some examples, for each scene, the LLM system compares the scene code to one or more of the layout description and purpose description of each layout template and selects a layout template for a respective scene as a best-matching layout template. For example, the layout template having a layout description and/or a purpose description that the LLM system determines best-matches the scene code (e.g., "visualization").

In some implementations, for each scene, the LLM system returns an identifier of a layout template (e.g., layout_01, layout_02, . . . , layout_32) that is selected. In this manner, a set of layout templates is provided, which can be considered a sub-set of the pre-defined set of layout templates.

In some implementations, for each layout template identified by the LLM system, and thus, for each scene, a prompt is sent to the LLM system to extract data and fill in placeholders of a respective layout template with data values. In some examples, the prompt is provided with the original user input (e.g., the example above, As the Head of the new technologies organization at ACME, . . . ). In some examples, the prompt includes a reference to an external data source where data should be extracted from. An example prompt can be provided as:

PREVIOUS STEPS:
. . .
YOUR TASK:
Your task is to extract the relevant information/data specified in the scene abstract from the initial user prompt and transform it into a processable data structure. Keep in mind, that the extracted information is meant to be self-narrating.
{layout variables format instructions}
INITIAL USER PROMPT:
{initial user prompt}
. . .

Here, {initial_user_prompt} is the user input and {layout_variables_format_instructions} is computer-readable code (e.g., JSON) for a respective layout template, a non-limiting example of which can include that provided in Listing 4:

Listing 4: Example Layout Template Code

```
{
    "id": "layout_01",
    "description": "A scene showing a Pie Chart along with a heading and subheading",
    "variables": {
        "heading": {
            "type": "string",
            "description": "The heading of the scene, maximum 15 characters",
            "maxLength": 15
        },
        "subheading": {...},
        "chart_data": {...}
    }
    ...
},
```

In some implementations, for each scene, the LLM system returns a scene layout to provide a set of scene layouts that collectively define a storyboard. Each scene layout is a layout template that has been populated with data by the LLM system. In some examples, the data is provided from a data source identified by the user. In some examples, the data is dummy data generated by the LLM system (e.g., in response to a user request for dummy data).

Figure 6:
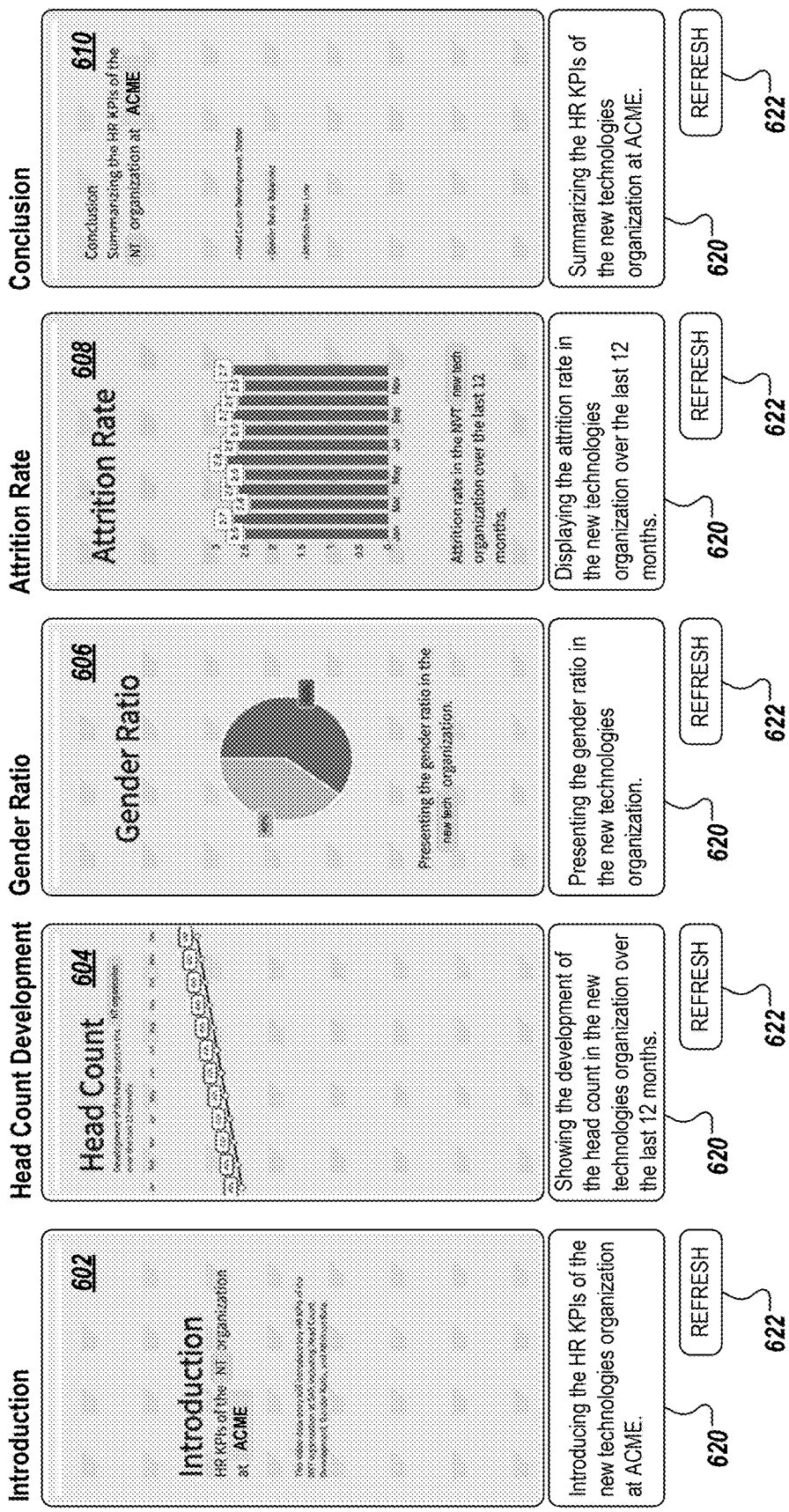
FIG. 6 depicts an example storyboard that is generated using AI in accordance with implementations of the present disclosure.

FIG. 6 depicts an example storyboard 600 that is generated using AI in accordance with implementations of the present disclosure. The example of FIG. 6 is generated based on the example user input introduced above (e.g., As the Head of the new technologies organization at ACME, . . . ) and includes scenes 602, 604, 606, 608, 610. In some examples, the storyboard editor displays the storyboard in a UI to enable review and revision by the user. For example, and with reference to the example of FIG. 6, the storyboard 600 can be displayed in a UI.

Figure 7:
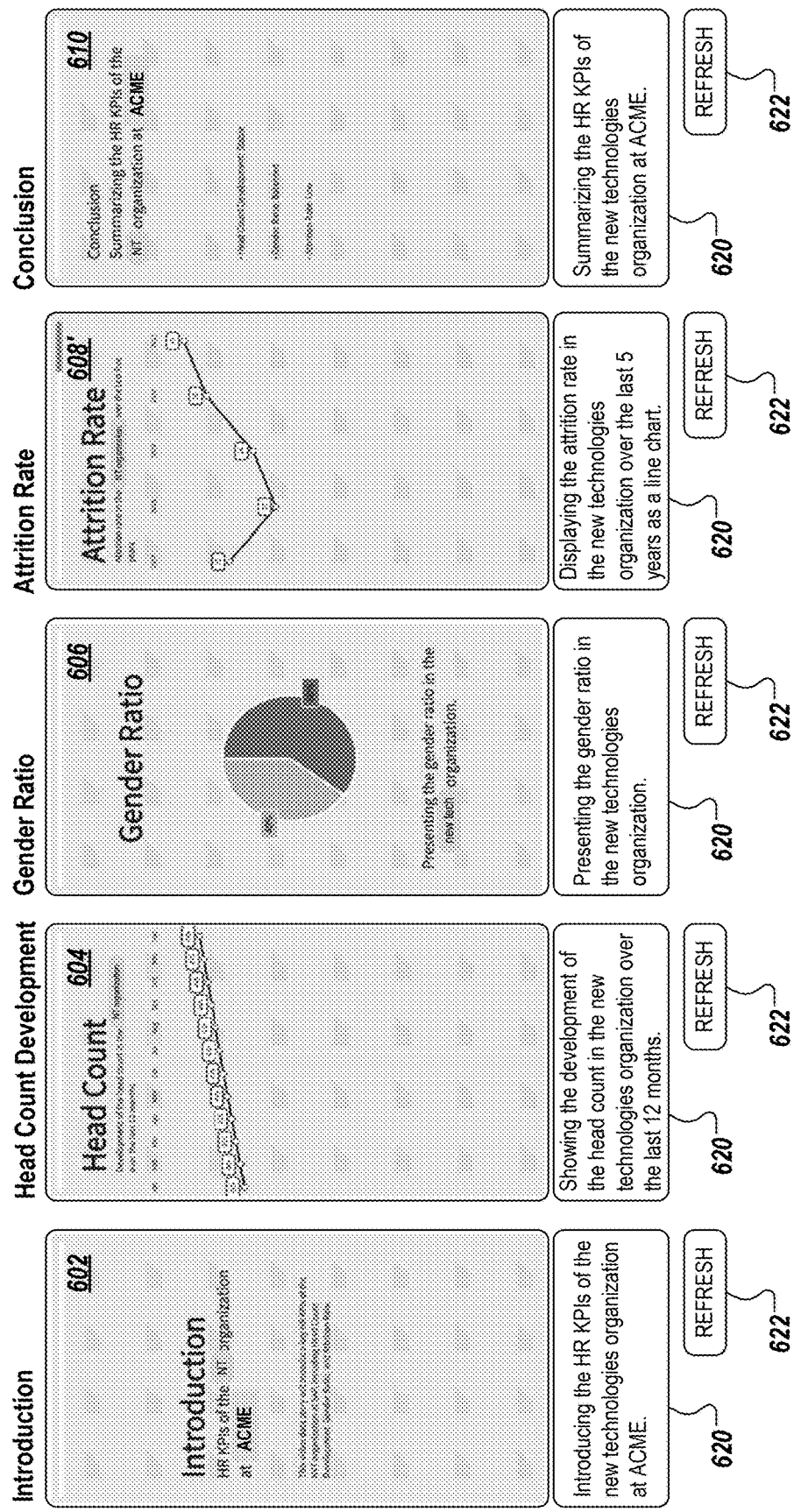
FIG. 7 depicts the example storyboard of FIG. 6 including user-initiated modifications.

In some examples, each scene 602, 604, 606, 608, 610 includes a text box 620 that is populated with an abstract for the respective scene 602, 604, 606, 608, 610. In some examples, the abstracts are provided from the storyboard code returned by the LLM system (see, e.g., Listing 2). In some examples, the user can revise a scene 602, 604, 606, 608, 610 by editing the abstract associated with the scene within the respective text box 620. By way of non-limiting example, the user can revise the scene 608 by editing the text from " . . . over the last 12 months" to " . . . over the last 5 years as a line chart" and can trigger processing by selecting a refresh button 622. In response, the LLM can be re-prompted, as described herein, with respect to the scene 608 to, for example, select another layout template. FIG. 7 depicts an example storyboard 600' as a modified version of the storyboard 600 of FIG. 6 responsive to the above-discussed example, user-initiated modifications. In the example of FIG. 7, the scene 608 of FIG. 6 has been modified to a scene 608'.

In some implementations, the user can add or remove scenes from the storyboard. For example, the UI that the storyboard is displayed in can include, for each scene, a delete option. Selection of the delete option removes the scene from the storyboard. The storyboard can be refreshed within the UI to display the storyboard without the scene. As another example, an add option can be provided adjacent to one or more scenes. In some examples, selection of an add option can result in addition of a scene adjacent to a respective scene. In some examples, the user can providing an abstract for the scene that is to be added, and a layout template can be selected for the scene, as described herein. The storyboard can be refreshed within the UI to display the storyboard with the scene added.

In some implementations, after the user is satisfied with the storyboard, the storyboard can be saved as a story template (e.g., in the database 332). In some examples, any data values that were populated into the storyboard code (respective scene code) are removed and replaced with the original placeholders. In this manner, the story template can be re-populated with data when used for downstream generation of videos, as described in detail herein.

Figure 8:
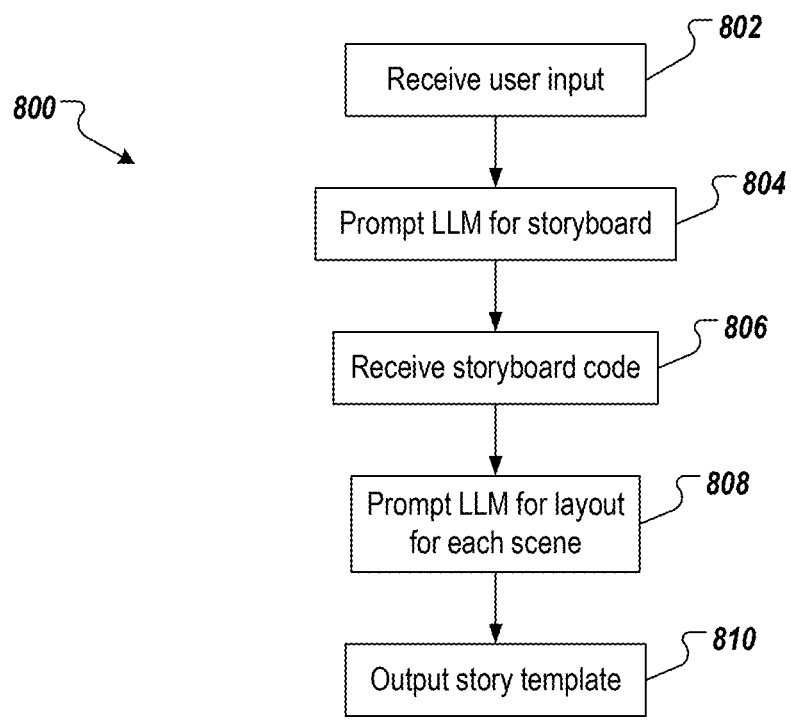
FIGS. 8 and 9 depict respective processes that can be executed in accordance with implementations of the present disclosure.

FIG. 8 depicts an example process 800 that can be executed in accordance with implementations of the present disclosure. In some examples, the example process 800 is provided using one or more computer-executable programs executed by one or more computing devices. In some examples, the example process 800 is executed for generating story templates.

User input is received (802). For example, and as described in detail herein, a user can interact with the story designer 320 of FIG. 3 to provide user input. In some examples, the user input can include a prompt that is descriptive of a story that the user would like to convey through a video (e.g., As the Head of the new technologies organization at ACME, . . . ). A LLM is prompted for a storyboard (804). For example, and as described in detail herein, the AI agent 370 can send a prompt to the LLM system 360 to request a storyboard. Code for the storyboard is received (806). For example, and as described in detail herein, the LLM system 360 can return storyboard code that is responsive to the prompt (e.g., Listing 2). The LLM system is prompted for a layout for each scene (808). For example, and as described in detail herein, the AI agent 370 can send a prompt to the LLM system 360 requesting that, for each scene, the LLM system 360 select a layout template from at least a portion of a predefined set of layout templates. A story template is output (810). For example, and as described in detail herein, the AI agent 370 can populate placeholders of the storyboard code with data values (e.g., actual data values, dummy data values) and the storyboard can be displayed in a UI of the story designer 320.

Figure 9:
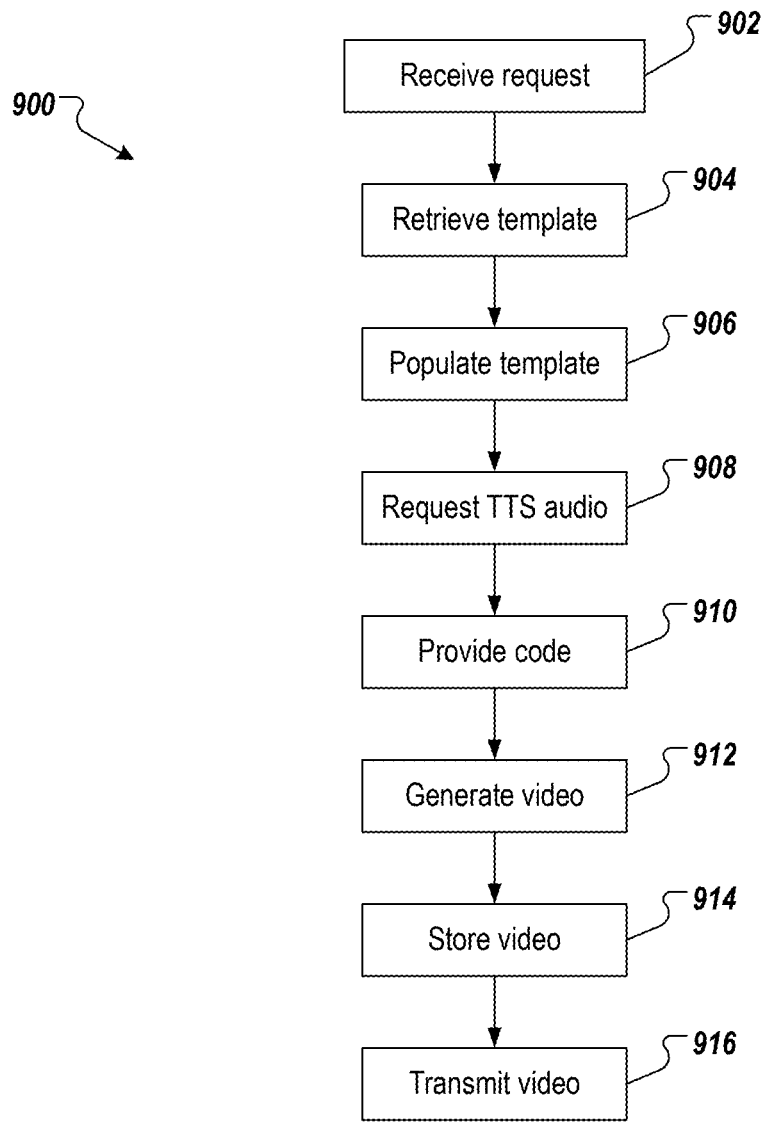

FIG. 9 depicts an example process 900 that can be executed in accordance with implementations of the present disclosure. In some examples, the example process 900 is provided using one or more computer-executable programs executed by one or more computing devices. In some examples, the example process 900 is executed for real-time generation of videos, which can include automatically (e.g., without human intervention) generating a video in response to receiving a request.

A request is received (902). For example, and as described herein, an application 310 of FIG. 3 can transmit a request to the video generation platform 302. In some examples, the request includes an identifier that indicates the story template that is to be used and a data payload that provides data values for data that is to be populated in the story template. A template is retrieved (904). For example, and as described herein, the story handler 324 retrieves the template from the data store 332 based on the identifier provided in the request. The template is populated (906). For example, and as described herein, the story handler 324 populates the data section of the story template with data values received with the request.

If TTS elements are indicated in the template, TTS audio is requested (908). For example, and as described herein, the story handler 324 sends a TTS job for each TTS element to the TTS service 350 and, in response, receives respective TTS audio for the TTS element(s). HTML code is provided from JSON (910). For example, and as described herein, the story handler 324 provides a job request to the broker service 326 for processing through the JSON2HTML queue 342, which transmits the job request to the J2H service 352 (through a respective worker), the job request including the story template. The J2H service converts the story template into HTML code and returns the HTML code.

A video is generated (912). For example, and as described herein, the story handler 324 provides a job request to the broker service 326 for processing through the video queue 344, which transmits the job request to the video generation service 354 (through a respective worker), the job request including the HTML code and TTS audio, if any. The video generation service 354 generates a video and returns the video. The video is stored (914) and the video is transmitted (916). For example, and as described herein, the video (video file) is stored in the video store 304. In some examples, one or more users that are determined to be the audience for the video (e.g., based on channel metadata, allowed user metadata) are alerted to the availability of the video. For example, a notification can be transmitted to a mobile application 308 of a user (e.g., a notification including a link (URL) to the video). In some examples, in response to user input (e.g., selecting the notification, clicking on the link), the video is retrieved from the video store 304 and transmitted to a device (e.g., smartphone, tablet) of the user to be played.

Figure 10:
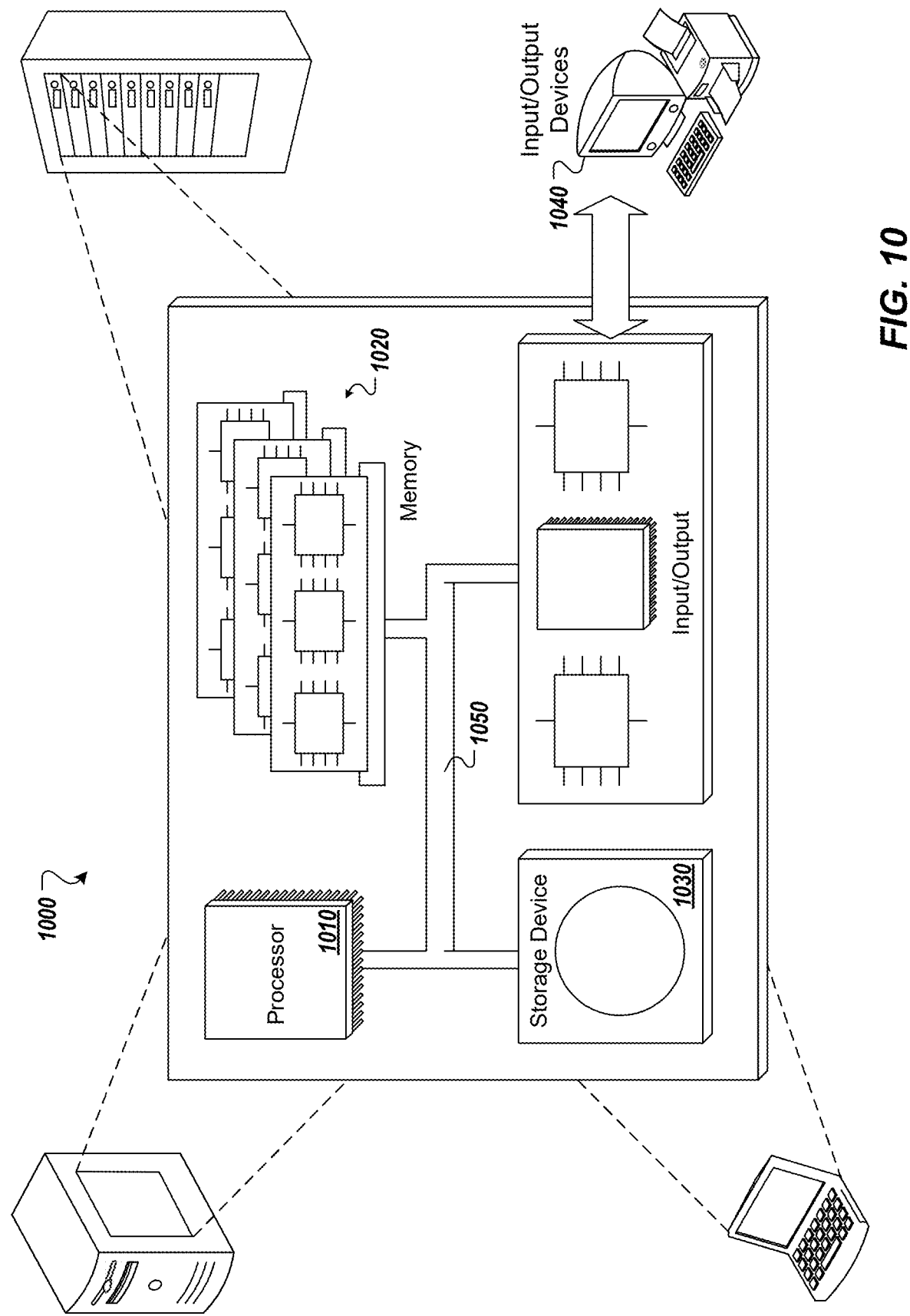
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1020, 1030, 1040 are interconnected using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1020 is a volatile memory unit. In some implementations, the memory 1020 is a non-volatile memory unit. The storage device 1030 is capable of providing mass storage for the system 1000. In some implementations, the storage device 1030 is a computer-readable medium. In some implementations, the storage device 1030 may be a floppy disk device, a hard disk device, an optical disk device, or a tape device. The input/output device 1040 provides input/output operations for the system 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for programmatic generation of videos, the method being executed by one or more processors and comprising:
   receiving user input comprising a description of a story that a user seeks to convey in a video;
   transmitting a first prompt to a large language model (LLM) system, the first prompt comprising at least a portion of the user input;
   receiving, from the LLM system, storyboard code representative of a set of scenes;
   in response to the storyboard code, for each scene in the set of scenes:
      transmitting a second prompt to the LLM system, the second prompt comprising at least a portion of the storyboard code and a predefined set of layout templates, and
      receiving, from the LLM system, identification of a layout template of the predefined set of layout templates for a respective scene;
   for one or more layout templates in a set of layout templates identified by the LLM system, populating at least one placeholder with a data value; and
   displaying, in a user interface (UI), a storyboard for the video, the storyboard comprising graphical display of one or more scenes of the set of scenes.

2. The method of claim 1, wherein the storyboard code comprises, for each scene, a description of a visualization of the respective scene, a layout template being identified by the LLM system at least partially in response to the description of the visualization.

3. The method of claim 1, wherein each layout template in the predefined set of layout templates is associated with at least one description, one or more layout templates being identified by the LLM system at least partially in response to the description.

4. The method of claim 1, wherein populating at least one placeholder with a data value is executed by the LLM system in response to a third prompt at least partially comprising the user input.

5. The method of claim 1, further comprising:
   receiving, from the user, revisions to an abstract displayed with a scene of the storyboard and in response, providing a modified scene using the LLM system responsive to the revisions.

6. The method of claim 1, wherein each layout template is provided in Javascript Object Notation (JSON).

7. The method of claim 1, further comprising:
   receiving a request comprising a template identifier and a data payload;
   retrieving, from a data store, the story template based on the template identifier, the story template being of a first format and defining content elements and data to be depicted in a video;
   populating one or more data values of the data payload into the story template;
   providing, based on the story template, code in a second format that is different from the first format;
   generating the video based on the code; and
   transmitting the video to one or more users.

8. A non-transitory computer-readable storage medium coupled to one or more processors and having instructions stored thereon which, when executed by the one or more processors, cause the one or more processors to perform operations for programmatic generation of videos, the operations comprising:
   receiving user input comprising a description of a story that a user seeks to convey in a video;
   transmitting a first prompt to a large language model (LLM) system, the first prompt comprising at least a portion of the user input;
   receiving, from the LLM system, storyboard code representative of a set of scenes;
   in response to the storyboard code, for each scene in the set of scenes:
      transmitting a second prompt to the LLM system, the second prompt comprising at least a portion of the storyboard code and a predefined set of layout templates, and
      receiving, from the LLM system, identification of a layout template of the predefined set of layout templates for a respective scene;
   for one or more layout templates in a set of layout templates identified by the LLM system, populating at least one placeholder with a data value; and
   displaying, in a user interface (UI), a storyboard for the video, the storyboard comprising graphical display of one or more scenes of the set of scenes.

9. The non-transitory computer-readable storage medium of claim 8, wherein the storyboard code comprises, for each scene, a description of a visualization of the respective scene, a layout template being identified by the LLM system at least partially in response to the description of the visualization.

10. The non-transitory computer-readable storage medium of claim 8, wherein each layout template in the predefined set of layout templates is associated with at least one description, one or more layout templates being identified by the LLM system at least partially in response to the description.

11. The non-transitory computer-readable storage medium of claim 8, wherein populating at least one placeholder with a data value is executed by the LLM system in response to a third prompt at least partially comprising the user input.

12. The non-transitory computer-readable storage medium of claim 8, wherein operations further comprise:

receiving, from the user, revisions to an abstract displayed with a scene of the storyboard and in response, providing a modified scene using the LLM system responsive to the revisions.

13. The non-transitory computer-readable storage medium of claim 8, wherein each layout template is provided in Javascript Object Notation (JSON).

14. The non-transitory computer-readable storage medium of claim 8, wherein operations further comprise:
  receiving a request comprising a template identifier and a data payload;
  retrieving, from a data store, the story template based on the template identifier, the story template being of a first format and defining content elements and data to be depicted in a video;
  populating one or more data values of the data payload into the story template;
  providing, based on the story template, code in a second format that is different from the first format;
  generating the video based on the code; and
  transmitting the video to one or more users.

15. A system, comprising:
  a computing device; and
  a computer-readable storage device coupled to the computing device and having instructions stored thereon which, when executed by the computing device, cause the computing device to perform operations for programmatic generation of videos, the operations comprising:
    receiving user input comprising a description of a story that a user seeks to convey in a video;
    transmitting a first prompt to a large language model (LLM) system, the first prompt comprising at least a portion of the user input;
    receiving, from the LLM system, storyboard code representative of a set of scenes;
    in response to the storyboard code, for each scene in the set of scenes:
      transmitting a second prompt to the LLM system, the second prompt comprising at least a portion of the storyboard code and a predefined set of layout templates, and
      receiving, from the LLM system, identification of a layout template of the predefined set of layout templates for a respective scene;
    for one or more layout templates in a set of layout templates identified by the LLM system, populating at least one placeholder with a data value; and
    displaying, in a user interface (UI), a storyboard for the video, the storyboard comprising graphical display of one or more scenes of the set of scenes.

16. The system of claim 15, wherein the storyboard code comprises, for each scene, a description of a visualization of the respective scene, a layout template being identified by the LLM system at least partially in response to the description of the visualization.

17. The system of claim 15, wherein each layout template in the predefined set of layout templates is associated with at least one description, one or more layout templates being identified by the LLM system at least partially in response to the description.

18. The system of claim 15, wherein populating at least one placeholder with a data value is executed by the LLM system in response to a third prompt at least partially comprising the user input.

19. The system of claim 15, wherein operations further comprise:
  receiving, from the user, revisions to an abstract displayed with a scene of the storyboard and in response, providing a modified scene using the LLM system responsive to the revisions.

20. The system of claim 15, wherein each layout template is provided in Javascript Object Notation (JSON).

* * * * *